(12) United States Patent
Götzenberger

(10) Patent No.: US 7,732,946 B2
(45) Date of Patent: Jun. 8, 2010

(54) CURRENT SOURCE, CONTROL DEVICE AND METHOD FOR OPERATING SAID CONTROL DEVICE

(75) Inventor: Martin Götzenberger, Ingolstadt (DE)

(73) Assignee: VDO Automotive AG, Munich (DE)

( * ) Notice: Subject to any disclaimer, the term of this patent is extended or adjusted under 35 U.S.C. 154(b) by 281 days.

(21) Appl. No.: 12/064,846

(22) PCT Filed: Aug. 22, 2006

(86) PCT No.: PCT/EP2006/065548

§ 371 (c)(1),
(2), (4) Date: Feb. 26, 2008

(87) PCT Pub. No.: WO2007/023159

PCT Pub. Date: Mar. 1, 2007

(65) Prior Publication Data

US 2008/0238199 A1    Oct. 2, 2008

(30) Foreign Application Priority Data

Aug. 26, 2005 (DE) .................. 10 2005 040 531

(51) Int. Cl.
*H01H 19/14* (2006.01)
*B60L 1/00* (2006.01)
(52) U.S. Cl. .................................. 307/115; 307/10.1
(58) Field of Classification Search ............... 307/115, 307/38, 10.1
See application file for complete search history.

(56) References Cited

U.S. PATENT DOCUMENTS

| 7,455,051 B2* | 11/2008 | Gotzenberger | 123/478 |
| 2008/0202475 A1* | 8/2008 | Gotzenberger | 123/479 |
| 2008/0231245 A1* | 9/2008 | Schmauss et al. | 323/282 |

* cited by examiner

*Primary Examiner*—Albert W Paladini
*Assistant Examiner*—Michael Rutland Wallis
(74) *Attorney, Agent, or Firm*—Laurence A. Greenberg; Werner H. Stemer; Ralph E. Locher

(57) ABSTRACT

A current source includes a first switching element configured to adjust an output current according to a control signal received at a control input. The current source also includes a reference resistance, which is electrically coupled to the first switching element such that the output current flows through the reference resistance. The latter includes first and second individual reference resistors, connected in series, and a diode connected in parallel to the first reference resistor. The first reference resistor has a higher impedance than the second reference resistor. A controller receives a predetermined reference potential and an actuating signal that constitutes the control signal of the first switching element. A second switching element supplies the controller with an actual value consisting of the voltage across the first and second individual reference resistors, when the element adopts a first switching position and consisting of the voltage drop across the second individual reference resistor, when the element adopts a second switching position.

11 Claims, 2 Drawing Sheets

CURRENT SOURCE, CONTROL DEVICE AND METHOD FOR OPERATING SAID CONTROL DEVICE

BACKGROUND OF THE INVENTION

Field of the Invention

The invention relates to a current source, a control device and a method for operating said control device, especially for use for a piezo actuator.

Ever more stringent legal requirements in relation to permissible pollutant emissions of internal combustion engines which are disposed in motor vehicles make it necessary to take various measures through which the pollutant emissions are reduced. One approach in this case is to reduce the pollutant emissions created during the process of air/fuel mixture combustion. The formation of soot in particular is heavily dependent on the preparation of the air/fuel mixture in the respective cylinder of the internal combustion engine. In order to obtain a very good mixture preparation, fuel is increasingly dispensed at very high pressure. In the case of diesel internal combustion engines the fuel pressures amount to up to 2000 bar. Injection valves with a piezo actuator as an actuator are increasingly being used for such applications. The outstanding feature of piezo actuators is their very short response time. These types of injection valve are thus suitable if necessary for dispensing fuel several times within an operating cycle of a cylinder of the internal combustion engine.

An especially good mixture preparation can be achieved if one or more pre-injections, also known as pilot injections, are performed before a main injection, with the mass of fuel to be dispensed if necessary for each pilot injection being very small. A precise activation of the injection valve is very important, especially in these cases.

The charging and discharging of the piezo actuator assumes an important role in conjunction with the precise activation of the injection valve. For this purpose a power output stage is regularly provided, which cannot however be completely discharged during the discharging process of the piezo actuator. For complete discharging a circuit element is then provided in this connection which can assume this task but in doing so however is subject to thermal stresses.

SUMMARY OF THE INVENTION

The object of the invention is, in accordance with a first aspect, to create a simple current source by means of which two different output currents can be set. In accordance with a further aspect the object of the invention is to create a control device and a method for operating said control device by means of which two different output currents are able to be set in a simple manner.

The object is achieved by the features of the independent claims. Advantageous embodiments of the invention are identified in the subclaims.

The outstanding feature of the invention in accordance with a first aspect is a current source with a first circuit element, which has a control input and is embodied so that, depending on a control signal at its control input, an output current can be set on the output side of the current source. It also has a reference resistance, which is electrically coupled to the first circuit element so that the output current flows through the reference resistance. The reference resistance features first and second individual reference resistances arranged in series. Furthermore a diode is connected in parallel to the first reference resistance and is connected in a conductive direction corresponding to the stipulated current direction through the reference resistance. The first individual reference resistance is of higher impedance than the second individual reference resistance. The current source also includes a controller to which a predetermined reference potential is supplied as a setpoint value and of which the corrective signal is the control signal of the first circuit element. The current source also has a second circuit element which is embodied and arranged to apply to the controller a first potential difference as a setpoint value which is representative for a voltage drop across the first and second individual reference resistance in a first switching position and with a second potential difference as a required value which is representative for a voltage drop across the second individual reference resistance in a second switching position. This has the advantage of only one reference potential being needed to realize two different output currents of the current source. This is accompanied by a lower outlay in terms of circuitry, especially by comparison with providing a corresponding circuit arrangement for implementing two different reference potentials.

The other outstanding feature of the reference resistance is that it has different impedance values depending on the voltage drop across the first and second reference resistance. This is implemented particularly simply by connecting the diode in parallel to the first individual reference resistance. The fact that the first individual reference resistance is of higher impedance than the second individual reference resistance thus allows clearly different output currents to be set at the current source and this can be done highly accurately in each case, even in respect of an offset of the corrective signal of the controller. In addition the first and second individual reference resistances can each be embodied with the small tolerance suitable for the respective output current.

In accordance with an advantageous embodiment of the first aspect of the invention the controller and the second circuit element are arranged in an integrated circuit and the reference resistance and the first circuit element are arranged externally to the integrated circuit. The advantage of this is that few inputs or outputs of the integrated circuit are needed to realize the current source. On the other hand the integrated circuit can also be employed independently for the output current desired for the respective application and can be adapted by suitable individual reference resistances and a correspondingly suitable first circuit element to the respective application. The current source can thus be produced at low cost in overall terms.

In accordance with a further advantageous embodiment of the first aspect of the invention a first control parameter path couples the controller electrically on its output side to a first node point which is arranged electrically between the first circuit element and the reference resistance. The first control path element has a predeterminable impedance. Thus the behavior of the controller can be set in a simple manner relative to a first output current which is assigned to the first switching position of the second circuit element.

In accordance with a further advantageous embodiment of the first aspect of the invention a second control parameter path is provided which couples the controller electrically on its output side to a second node point which is arranged electrically between the first and second individual reference resistance. The second control parameter path has a predeterminable impedance. In this way the control behavior can be set in a simple manner relative to a second output current which is assigned to the second switching position of the second circuit element.

In accordance with a further advantageous embodiment of the first aspect of invention the predeterminable impedance in the first and/or second control parameter path is embodied so that a proportional and integral control behavior is embodied. This has proved to be especially favorable.

In accordance with a further advantageous embodiment of the first aspect the predetermined impedance of the second control parameter path is around at least one order of magnitude smaller than the predeterminable impedance of the first control parameter path. This has the advantage that the control behavior in respect of the setting of the first or of the second output current can be made practically independently.

In accordance with a second aspect the outstanding feature of the invention is a control device with the current source which is provided for controlling a piezo actuator, with the current source being able to be coupled with the piezo actuator so that it can discharge the piezo actuator.

The control device has a power output stage for charging and discharging the piezo actuator, which is arranged electrically in parallel to the current source.

The advantages of the first aspect of the invention and its advantageous embodiment correspond to those of the second aspect of the invention.

In accordance with of a third aspect a method for operating the control device is provided in which the power output stage is activated for discharging the piezo actuator and subsequently the second circuit element is set to its second switching position for further discharging of the power output stage, which sets the first output current. If there is an error in the power output stage the second circuit element is set to its first switching setting for discharging the piezo actuator, which sets the second output current. This has the advantage of enabling the output current, and in fact the second output current, to be selected suitably high for almost complete residual discharging of the piezo actuator, without damaging the first circuit element thermally. Furthermore the output current, and indeed the first output current can be set suitably low, in order not to thermally overload the first circuit element and simultaneously be able to completely discharge the piezo actuator, if discharging supported by the output stage is not possible or is rendered more difficult, especially also to establish a secure state in the event of specific error states or defects of the output stage. Thus good protection can be given to persons wishing to replace the controller.

Exemplary embodiments of the invention are explained below with reference to schematic diagrams. The figures show:

BRIEF DESCRIPTION OF THE DRAWINGS

Elements with identical construction or which function in the same way are identified by the same reference symbols in all figures.

DESCRIPTION OF THE PREFERRED EMBODIMENTS

Figure 1:
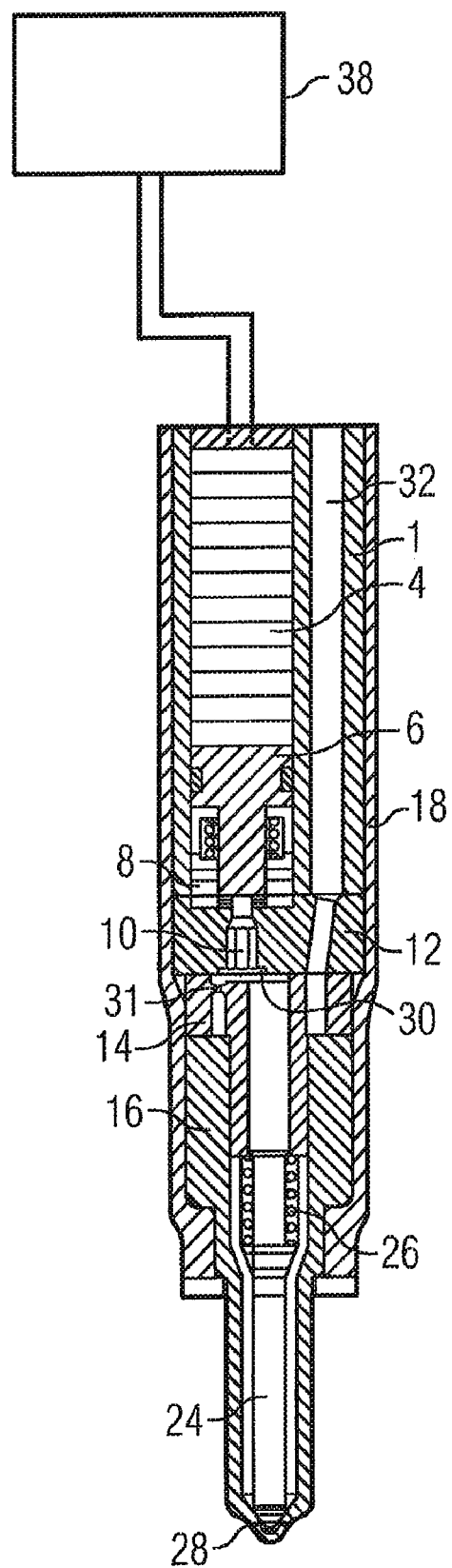
FIG. 1 an injection valve with a control device.

An injection valve (FIG. 1) has a injector housing 1 with a recess into which a piezo actuator PAKT1, is fitted, which is coupled to a transmitter 6. The transmitter 6 is arranged in a leakage space 8. A switching valve 10, which is preferably embodied as a servo valve, is arranged so that it controls a leakage fluid, which is preferably the fuel, as a function of its switching position. The switching valve is coupled via the transmitter to the piezo actuator PAKT1 and is driven by it, meaning that the switching position of the switching valve 10 is set by means of the piezo actuator PAKT1. If necessary the piezo actuator PAKT1 can also act on the switching valve 10 without the intervention of the transmitter 6. The switching valve 10 is arranged in a valve plate 12. It comprises a valve element, the position of which can be set by means of the piezo actuator PAKT1 and which, in one switch position, is in contact with the valve plate and thus prevents the fuel being driven back into the leakage space. In a further switching position it is at a distance from a wall of the valve plate 12 and thus enables the fuel to be driven back into the leakage space 8. The piezo actuator comprises a stack of piezo elements. The stack of piezo elements includes for example around 200 piezo elements layered one above the other. The stack of piezo elements is preferably surrounded by a coil spring which tensions the stack of piezo elements between the transmitter 6 and a closure element.

The injection valve further comprises a needle guide body 14 and a nozzle body 16. The valve plate 12, the needle guide body 14 and the nozzle body 16 form a nozzle module which is attached by means of a nozzle clamping nut 18 to the Injector housing 1.

The needle value body 14 has a recess which is continued as the recess of the nozzle body 16 in the nozzle body 16 and in which an injector needle 24 is arranged. The injector needle 24 is guided in the needle guide body 14. A nozzle spring 26 holds the injector needle 24 in a closed position by preventing fuel from flowing through an injection bore 28.

At the axial end of the injector needle 24, which faces towards the valve plate 12, is embodied a control chamber 30 which is hydraulically coupled via an inlet flap 31 to a high-pressure bore 32. If the switching valve 10 is in its closed position, the control chamber 30 is hydraulically decoupled from the leakage space 8. The result of this is that after the switching valve closes 10 the pressure in the control chamber 30 essentially equalizes the pressure in the high-pressure bore 32. When used in the injection valve in an internal combustion engine the high-pressure bore 32 is hydraulically coupled to a high-pressure accumulator and is thus supplied with fuel at a pressure of for example up to 2000 bar.

As a result of the fluid pressure in the control chamber 30 on a face of the injector needle 24, a force is exerted via the control chamber 30 in the closing direction of the injector needle 24. The injector needle 24 also features, spaced axially from its front face, a step to which fluid which is flowing through the high-pressure bore 32 is applied such that a force acts to open the injector needle 24 i.e. against the closure direction. In its closed position the injector needle 24 suppresses a flow of fuel through the injection nozzle 28. If the injector needle 24, starting from its closed position, moves into the control chamber 30, it releases the flow of fuel through the injection nozzle 28, especially in its open position, by coming into contact with the area of the wall of the control chamber 30 which is embodied by the valve plate 12.

Whether the injector needle 24 is in its open position or in its closed position depends on whether the force which is generated at the step of the injector needle 24 by the pressure of the fluid bus obtaining there is greater than or less than the force generated by the nozzle spring 26 and the pressure acting on the front face of the injector needle 24.

If the switching valve 10 in its open position, fluid flows from the control chamber 30 through the switching valve 10 into the leakage space 8. With suitable dimensioning of the inlet flap the pressure in the control chamber 30 then drops, which finally leads to a movement of the injector needle into its open position. The pressure of the fluid in the leakage space 8 is far lower than the pressure of the fluid in the high-pressure bore.

A control device 38 is assigned to the injection valve. The control device 38 is embodied for creating a corrective signal SG for the piezo actuator PAKT1 of the injection valve. The control device 38 is preferably further embodied for creating a corrective signal for further piezo actuators PAKT2-4, which are assigned to further injection valves.

The corrective signal SG is preferably a current signal, which is preferably pulse-height-modulated. Beginning from a start of a charging process LV, a predetermined number of pulses, so for example 20, are generated, with a predetermined duration and period, until the charging process is completed.

The height of the respective pulse sets the electrical energy to be supplied during the charging process to the piezo actuator PAKT1. The energy to be supplied to the piezo actuator PAKT1 during a charging process LV is determined as a function of operating parameters. The energy supplied to the piezo actuator PAKT1 influences its axial stroke and thus also the progress of the pressure in the control chamber 30.

The control device 40 is further embodied to execute a discharging process of the piezo actuator PAKT1. Preferably a predetermined number of discharge pulses is created for this purpose, 20 for example, with a predetermined duration and period. The height of the respective pulse sets the electrical energy to be removed during the discharging process from the piezo actuator PAKT1. The energy removed from the actuator influences its axial stroke reduction.

Figure 2:
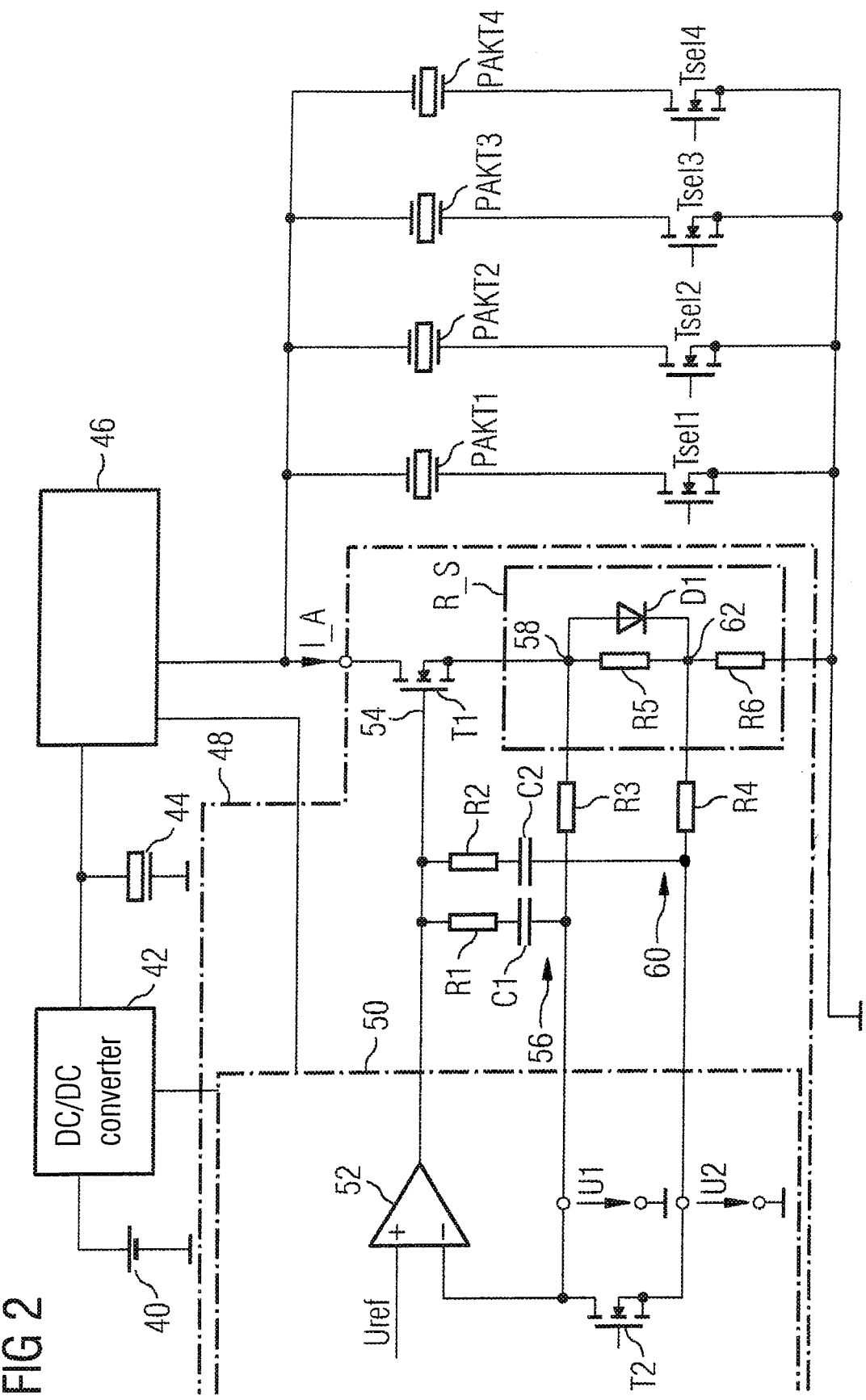
FIG. 2 a more detailed diagram of parts of the control device in accordance with FIG. 1.

A part of the control device 38 is shown with reference to FIG. 2. The control device 38 comprises a voltage amplifier, also called a DC/DC converter which is coupled electrically to a vehicle electrical system 40 which is embodied to supply the DC/DC converter 42 with a predetermined voltage and thus forms a voltage source. The vehicle electrical system includes a vehicle battery for example.

The DC/DC converter 42 is coupled electrically to a power output stage 46. Preferably a capacitor 44 is connected between them and is connected so that electrical energy in the discharge process of the respective piezo actuator PAKT1 to PAKT4 can be buffered in the capacitor 44 and used for future charging processes.

The power output stage 46 of the control device 38 is electrically coupled to piezo actuators PAKT1 to PAKT4, which are embodied separately from the control device 38 and are embodied in the injection valve. Preferably one power output stage 46 is assigned to a number of piezo actuators PAKT1 to PAKT4 for cost reasons. The respective piezo actuators PAKT1 to PAKT4 to be charged or discharged are preferably selected using selection elements TSEL1 to TSEL4.

In a discharging process which is controlled by the power output stage 46 a residual charge remains in the respective piezo actuator PAKT1 to PAKT4 after the predetermined number of discharge pulses. If this residual charge is also to be removed from the respective piezo actuator PAKT1 to PAKT4 a current source 48 which is provided for this purpose is activated by the control device 38.

The current source 48 comprises an application-specific integrated circuit, also known as an ASIC. Embodied in the ASIC 50 is a controller 52 which preferably includes an operational amplifier. The controller 52 is coupled electrically-conductively on the output side to a control input 54 of a first circuit element T1. During operation the controller 52 creates a corrective signal at its output which is a control signal of the first circuit element T1.

The first circuit element T1 is embodied and arranged so that, depending on the control signal, an output current I_A can be set on the output side of the current source. The output current I_A represents a discharge current for the respective piezo actuator PAKT1 to PAKT4 in the current direction indicated.

The current source 48 further includes a reference resistance R_S, which is coupled electrically to the first circuit element T1 so that the output current I_A flows through the reference resistance R_S. The reference resistance R_S has a first and second individual reference resistance R5, R6 arranged in series and a diode D1 which is connected in parallel to the first individual reference resistance R5 and is connected in the conducting direction corresponding to the stipulated direction through the reference resistance R_S. The first individual reference resistance R5 is of higher impedance than the second individual reference resistance R6. Depending on input currents I_A to be set, the ratio between the first and the second individual reference resistance R5, R6 amounts to around 50 for example.

Further embodied in the second ASIC 50 is the second circuit element T2, which is embodied and arranged so that a first potential difference U1 is applied as an actual value to the control 52 which is representative of a voltage drop across the first and second individual reference resistances R5 and R6, in a first switching position, and a second potential difference U2 is applied as an actual value, which is representative of voltage drop across the second reference resistance R6, in a second switching position of the second circuit element. A reference potential U_REF can be applied to the controller 52 at one of its other inputs.

The current source 48 also features preferably a first control parameter path 56, through which a first node point 58 is electrically coupled to the controller 52 on its output side. The first node point 58 is arranged electrically between the first circuit element T1 and the reference resistance R_S. The first controller path element 46 has a predeterminable impedance.

Furthermore a second control parameter path 60 is preferably provided which electrically couples the controller 52 on its output side to a second node point 62. The second node point 62 is arranged electrically between the first and second reference resistance R5, R6. The second control parameter path 60 likewise has a predeterminable impedance.

It has proved to be especially advantageous for the first control parameter path 56 to have a first impedance, which is preferably embodied as resistance R1 in a series circuit with a capacitor C1. Furthermore the first control parameter path 56 advantageously has a second impedance, which is preferably embodied as resistor R3.

Likewise the second control parameter path 60 preferably has a third impedance, which is preferably embodied as a series circuit comprising a resistor R2 and a capacitor C2. Preferably a fourth impedance, which is preferably embodied as resistor R4, is provided in the second control parameter path 60. Control parameters are set by the first and second impedances which are effective in the first switching position of the second circuit element T2 for setting the output current I_A, which is designated as the first output current for this switching position.

Control parameters can be set by the third and fourth impedances which are relevant to the setting of the output current I_A in the second switching position of the second circuit element T2. For this case the output current I_A will be designated as the second output current.

By suitable selection of the first and second or of the third and fourth impedance any given control behavior, for example a P, PI or PID control behavior, can be set for setting the output current I_A. It has proved especially suitable to embody the first and second impedance or the third and fourth impedance in order to produce a proportional-integral control behavior (PI). For this purpose the first and second impedances or the third and fourth impedances are then embodied in accordance with the circuit arrangement shown in FIG. 2 with the resistors R2, R3, R4 and the capacitors C1 and C2.

It has further proved to be very advantageous to embody the control parameters which are defined by the impedance values of the first and second impedances for the first control parameter path or by the third and fourth impedances for the second control parameter path 60 to clearly differ and to preferably embody them so that the control parameters assigned to the second control parameter path 60 are preferably at least one order of magnitude smaller than those assigned to the first control parameter path 56. The third and fourth impedances are thus preferably smaller than the first and second impedances. This allows a setting behavior for setting the first or second output current to be set practically independently.

In the event of an error, for example for an error in the power output stage 46, the current source is suitable for taking away the entire electrical energy stored in the respective piezo actuator PAKT1 to PAKT4, which for example can lie between 70 and 100 mJ. For this purpose the reference-potential U_REF is supplied to the controller 52 as the setpoint value and the second circuit element T2 is put into the first switching position, in which the controller 52 is supplied with the first potential difference U1 as the setpoint value. The corrective signal of the controller thus depends in this case on the difference between the reference potential U_REF and the first potential difference U1. The reference potential U_REF is suitably embodied for interaction with the reference resistance R_S, and here especially with the first individual reference resistance R5, so that the first output current assumes the desired value and in this area the diode D1 is not yet operated in the conducting direction, i.e. the voltage drop at the first individual reference resistance R5 is still smaller than the conducting voltage of the diode D1. The second individual reference resistance R6 is embodied with a much lower impedance than the first individual reference resistance R5. The result of this is that in the first switching position of the second circuit element T2 only a very small voltage drops across the second individual reference resistor R6. The dimensioning of the first individual reference resistance R5, of the resistance R3 and of the reference potential difference UREF influence the first output current.

Thus the desired low amount of first output current can be set in the first switching position of the second circuit element and thus for example for an error of the power output stage of the respective piezo actuator PAKT1 to PAKT4 completely discharged by the current source 48, without placing too much thermal stress on the first circuit element T1.

Preferably the control parameters for the first switching position of the second circuit element are set so that a relatively hard switching of the output current I_A is also possible.

In a normal mode of the control device, for discharging the respective piezo actuator PAKT1 to PAKT4 the power output stage 46 is first activated in accordance with the procedure already outlined above. Subsequently, to remove the remaining residual discharge in the respective piezo actuator PAKT1 to PAKT4 the reference potential U_REF is supplied to the controller 52 as the setpoint value. The second circuit element is put into its second switching position by the second potential difference U2 being supplied as the actual value to the controller 52 on its input side. The result of this is that on the output side of the controller 52 the corrective signal is created so that the first switching element T1 sets the output current I_A to the second output current. The first switching element T1 is preferably embodied as a self-blocking N-MOSFET transistor and is operated in the pinch-off region. Thus in this area, with the control signal at the control input of the first circuit element T1 remaining the same, a practically constant output current I_A is guaranteed, regardless of the potential difference dropping to a reference potential. However, by feeding back the first potential difference U1 or in the second switching position of the second circuit element the second potential difference U2 at the controller 52 interference influences such as a temperature-dependent switching characteristic of the first circuit element T1 or production variations of the first circuit element T1 can however be compensated for. It has proved especially advantageous in this case to set the control parameters which are effective in the second switching position of the second circuit element T2 so that the output current I_A does not change too suddenly, i.e. is not switched too hard. The specific most suitable characteristics of the control parameters essentially depend on the respective characteristic of the respective piezo actuator PAKT1 to PAKT4.

The second output current typically has a much higher amount than the first output current. The second output current can for example mount to around 5 A, whereas the first output current in can amount to around 100 mA. The first individual reference resistance R5 is embodied with such a high impedance that for the second output current it is bridged by the diode D1 and the voltage drop across resistor R5 is almost constant regardless of deviations of the second output current.

By suitable dimensioning of the first and second individual reference resistances R5 and R6 and of the resistance R4 and of the reference voltage U_REF, in the second switching position of the second circuit element T2 it can be ensured that the diode D1 is driven in the conductive range and the resistance characteristic in this state of the reference resistance R_S is definitively determined by the second individual reference resistance R6 which is embodied with suitably low impedance. The especially very high second output current can be set very precisely with the same reference potential U_REF as the first output current.

The total electrical energy to be removed from the respective piezo actuator PAKT1 to PAKT4 by the power output stage 46 and the current source 48 amounts for example to between 70 and 100 mJ. Typically only around the last tenth of the electrical energy is removed in normal operation by the current source from the respective piezo actuator 1.

Because of the high second output current, which amounts to 5 A for example, the residual discharging can be undertaken by a very short appropriate control of the first switching element T1 and is thus accompanied by a high thermal stress for the first switching element unit, which only lasts for a very short time however and thus, given suitable thermal capacity of the first circuit, does not lead to any thermal destruction of the first switching element. By contrast the removal in the event of an error of the entire electrical energy stored in the respective piezo actuator PAKT1 to PAKT4 would involve very high thermal stress for the first switching element, if this were to occur in the second switching position of the second element, i.e. with the second output current could thus possibly lead to its thermal destruction or would on the other hand require the first switching element T1 to be dimensioned very generously, resulting in high space requirements and thereby higher costs. The option of setting the second output current makes a compact dimensioning of the first switching element T1 possible.

The invention claimed is:

1. A current source, comprising:

a first switching element having a control input and being configured and connected to set, in dependence on a control signal at said control input, an output current at an output side of the current source;

a reference resistance electrically connected to said first switching element for conducting therethrough the output current, said reference resistance including:

a first individual reference resistance and a second individual reference resistance connected in series and a diode connected in parallel with said first individual reference resistance in a forward direction corresponding to a conductive direction of a specified current flow through said reference resistance, said first individual reference resistance having a higher impedance than said second individual reference resistance;

a controller receiving a predetermined reference potential as a setpoint value and outputting a corrective signal forming the control signal of said first switching element;

a second switching element configured and connected to apply to said controller a first potential difference as an actual value representative of a voltage drop across said first and said second individual reference resistance, in a first switching position, and a second potential difference as an actual value representative of a voltage drop across said second individual reference resistance, in a second switching position.

2. The current source according to claim 1, wherein said controller and said second switching element are disposed in an integrated circuit and wherein said reference resistance and said first circuit element are disposed external to said integrated circuit.

3. The current source according to claim 1, which comprises a first control parameter path having a predeterminable impedance, said control parameter path connecting an output of said controller to a first node between said first switching element and said reference resistance.

4. The current source according to claim 3, wherein said predeterminable impedance in said first control parameter path is configured to implement proportional-integral control behavior.

5. The current source according to claim 3, which comprises a second control parameter path having a predeterminable impedance, said second control parameter path connecting the output of said controller to a second node between said first and second individual reference resistance.

6. The current source according to claim 5, wherein said predeterminable impedance in said second control parameter path is configured to implement a proportional-integral control behavior.

7. The current source according to claim 1, which comprises a control parameter path having a predeterminable impedance, said control parameter path connecting an output of said controller to a node between said first and second individual reference resistances.

8. The current source according to claim 7, wherein said predeterminable impedance in said control parameter path is configured to implement a proportional-integral control behavior.

9. The current source according to claim 5, wherein said predeterminable impedance of said second control parameter path is at least approximately one order of magnitude smaller than said predeterminable impedance of said first control parameter path.

10. A control device for controlling a piezo actuator, comprising:

a current source according to claim 1 connectible to the piezo actuator for discharging the piezo actuator; and a power output stage connected in parallel with said current source, for charging and discharging the piezo actuator.

11. A method of controlling a piezo actuator, which comprises:

providing the control device according to claim 10;

activating the power output stage for discharging the piezo actuator and subsequently switching the second switching element to the second switching position for further discharging the power output stage; and in an event of a power output stage error, switching the second switching element to the first switching position for discharging the piezo actuator.

* * * * *